(12) United States Patent
Muller

(10) Patent No.: US 9,593,914 B2
(45) Date of Patent: Mar. 14, 2017

(54) METHOD FOR ACQUIRING THE COORDINATES OF A TRIGGER POINT OF A PROJECTILE AND FIRE-CONTROL SYSTEM IMPLEMENTING THE METHOD

(71) Applicant: NEXTER SYSTEMS, Roanne (FR)

(72) Inventor: Sylvain Muller, St. Germain de la Grange (FR)

(73) Assignee: NEXTER SYSTEMS, Roanne (FR)

(*) Notice: Subject to any disclaimer, the term of this patent is extended or adjusted under 35 U.S.C. 154(b) by 0 days.

(21) Appl. No.: 14/653,100

(22) PCT Filed: Dec. 17, 2013

(86) PCT No.: PCT/FR2013/053142
§ 371 (c)(1),
(2) Date: Jun. 17, 2015

(87) PCT Pub. No.: WO2014/096686
PCT Pub. Date: Jun. 26, 2014

(65) Prior Publication Data
US 2015/0330744 A1    Nov. 19, 2015

(30) Foreign Application Priority Data
Dec. 17, 2012  (FR) ..................... 12 03495

(51) Int. Cl.
*F41G 7/00* (2006.01)
*F41G 7/34* (2006.01)
(Continued)

(52) U.S. Cl.
CPC ............... *F41G 7/007* (2013.01); *F41G 3/06* (2013.01); *F41G 3/14* (2013.01); *F41G 7/346* (2013.01);
(Continued)

(58) Field of Classification Search
CPC .. F42C 17/00; F42C 17/04; F41G 3/06; F41G 3/14; F41G 7/007; F41G 7/34;
(Continued)

(56) References Cited

U.S. PATENT DOCUMENTS 3,848,509 A * 11/1974 Corn ....................... F41G 3/142
                                                        327/552
4,794,235 A * 12/1988 Burke ...................... F41G 5/08
                                                        235/412
(Continued)

FOREIGN PATENT DOCUMENTS

EP          2009387 A1      12/2008

OTHER PUBLICATIONS

Apr. 22, 2014 International Search Report issued in International Application No. PCT/FR2013/053142.
(Continued)

*Primary Examiner* — Bernarr Gregory
(74) *Attorney, Agent, or Firm* — Oliff PLC

(57) ABSTRACT

The invention relates to a method for acquiring the coordinates of a trigger point (P) of a projectile (4) above a field part (1) on which a target (5a, 5b, 5c) is located. The method is characterized in that it comprises the following steps: emission of at least one laser pulse having a pre-determined duration and directed towards the target (5a, 5b, 5c); reception of the images reflected with a receiver equipped with means for the synchronous visualization of the laser pulses originating from a piece of observation of the field part (1); recovery of the coordinates of a desired trigger point (P) when the operator has chosen a location after the piece of observation was moved. The invention also relates to a fire-control system using such a method.

8 Claims, 3 Drawing Sheets

(51) Int. Cl.

| | | |
|---|---|---|
| *G01S 17/10* | (2006.01) | |
| *F42C 17/04* | (2006.01) | |
| *G01S 17/89* | (2006.01) | |
| *F41G 3/06* | (2006.01) | |
| *F41G 3/14* | (2006.01) | |
| *G01S 17/00* | (2006.01) | |

(52) U.S. Cl.
CPC .............. *F42C 17/04* (2013.01); *G01S 17/10* (2013.01); *G01S 17/89* (2013.01); *G01S 17/102* (2013.01)

(58) Field of Classification Search
CPC . F41G 7/346; F41G 3/08; F41G 3/142; F41G 5/08; F41G 7/008; G01S 17/10; G01S 17/102; G01S 17/02; G01S 17/50; G01S 17/58; G01S 17/88; G01S 17/89; G01S 7/02; G01S 7/48; G01S 7/495; G01S 13/003; G01S 13/02; G01S 13/50; G01S 13/52; G01S 13/58; G01S 13/66; G01S 17/003; G01S 17/06; G01S 17/42; G01S 17/66; F41J 5/06
See application file for complete search history.

(56) References Cited

U.S. PATENT DOCUMENTS

| | | | | |
|---|---|---|---|---|
| 4,920,412 | A | 4/1990 | Gerdt et al. | |
| 5,781,505 | A * | 7/1998 | Rowland | F41J 5/06 367/124 |
| 5,796,474 | A * | 8/1998 | Squire | G01S 17/66 250/203.6 |
| 6,057,915 | A * | 5/2000 | Squire | G01S 17/66 356/139.05 |
| 6,877,691 | B2 * | 4/2005 | DeFlumere | G01S 7/495 244/3.1 |
| 6,956,523 | B2 * | 10/2005 | Mohan | G01S 13/003 342/104 |
| 7,248,210 | B2 * | 7/2007 | Bruce | G01S 7/02 342/118 |
| 7,282,695 | B2 * | 10/2007 | Weber | G01S 7/495 250/203.1 |
| 7,345,743 | B1 * | 3/2008 | Hartman | G01S 17/42 356/4.01 |
| 7,492,308 | B2 * | 2/2009 | Benayahu | G01S 13/66 244/3.1 |
| 7,739,823 | B2 * | 6/2010 | Shapira | F41G 3/08 356/3 |
| 7,773,204 | B1 * | 8/2010 | Nelson | G01S 13/52 356/5.02 |
| 7,944,549 | B2 * | 5/2011 | Oron | G01S 17/003 356/28 |
| 8,294,609 | B2 * | 10/2012 | Graham | G01S 13/58 342/90 |
| 8,371,201 | B2 * | 2/2013 | Deflumere | F41G 7/008 89/1.11 |
| 8,755,036 | B2 * | 6/2014 | Hutchin | G01S 17/89 356/4.01 |
| 8,891,067 | B2 * | 11/2014 | Bamji | G01S 17/89 356/5.01 |
| 8,939,081 | B1 * | 1/2015 | Smith | G01S 17/88 102/213 |
| 8,941,042 | B2 * | 1/2015 | Hutchin | G01S 17/89 250/201.9 |
| 2004/0233097 | A1 | 11/2004 | McKendree et al. | |

OTHER PUBLICATIONS

Apr. 22, 2014 Written Opinion issued in International Application No. PCT/FR2013/053142.

* cited by examiner

METHOD FOR ACQUIRING THE COORDINATES OF A TRIGGER POINT OF A PROJECTILE AND FIRE-CONTROL SYSTEM IMPLEMENTING THE METHOD

BACKGROUND

The technical field of the invention is the field of methods allowing to acquire the coordinates of a trigger point of a projectile on a trajectory and above a field part on which a target is located.

In particular, the invention relates to fire-control systems which can be associated with a weapon firing explosive projectiles, or bursts of such projectiles.

The fire-control systems allow to provide the coordinates of a trigger point for a projectile fired by the weapon.

It is common to implement a fire-control system associating a laser range finder with a ballistic computer. The range finder allows to determine the distance to a target. The computer determines, based on this distance, the elevation and bearing angles to be given to the weapon as well as the programming to be provided to the projectile to be fired, such as the timing to fire the projectile.

The known fire-control systems are particularly well adapted when the target is visible, has a sufficient size and can be easily spotted, thus when the distance to the target can be easily measured.

However, these fire-control systems are unsuited for the acquisition of targets which are small-sized, scattered or temporarily or partially hidden. Indeed, it is almost impossible to find the range of such targets. The operator therefore has to perform several adjustment fires so as to determine the correct distance to trigger projectiles.

SUMMARY

The invention is intended to provide a method for acquiring the coordinates of a trigger point of a projectile, the method allowing to immediately engage with a high probability of interception a target of a small-size, scattered or hidden.

Thus, the invention relates to a method for acquiring the coordinates of a trigger point of a projectile or of a burst of projectiles on a trajectory and above a field part on which a target is located, characterized in that the method comprises the following steps:

emitting from a laser source at least one laser pulse having a determined duration and directed towards the field part where the target is located, receiving the images reflected by the field part with a receiver equipped with means for the synchronous visualization of the reflection of the laser pulses under the form of a piece of observation of the field part, the piece having a width which can be possibly modified by selecting a duration for the laser emission or reception, and the distance of the piece of observation with respect to the receiver can be modified by adjusting a delay between the emission and the reception of the laser pulse, recovering the coordinates of a desired trigger point by the operator when the operator has chosen a suitable location after having moved the piece of observation with respect to the receiver and possibly adjusted the width of the piece, the trigger point being within said piece.

Advantageously, the width of the piece will be chosen substantially equal to the depth of an area of effectiveness of the projectile or burst.

According to a particular embodiment, an image of the piece observed will be displayed on means for visualization intended for an operator, the image comprising a superimposed image of the area of effectiveness of the projectile or burst, when fired at a trigger point associated with said area of effectiveness and positioned within the piece of observation, the operator having the option to move the area of effectiveness with respect to the image of the piece, the coordinates of the trigger point being determined after the area of effectiveness was moved.

The invention also relates to a fire-control system which can be associated with a weapon firing projectiles or bursts of projectiles and allowing to provide the coordinates of a trigger point for a projectile or a burst fired by the weapon, the fire-control system implementing the method according to the invention and characterized in that the fire-control system comprises:

at least one synchronized pulses laser observation means associating a laser source or emitter which can emit pulses having a determined duration with a receiver equipped with means for the synchronous visualization of the reflection of the laser pulses under the form of a piece of observation of the field part having a width which can possibly be modified by selecting a duration for the laser emission or reception, and whose distance with respect to the receiver can be modified by adjusting a delay between the emission and the reception, a computer which can rebuild, using a suitable algorithm, an image of the piece of observation acquired by the observation means, the image being displayed on a means for visualization, first control means intended for a user and allowing to position and move said piece of observation at a greater or shorter distance from the observation means, second control means allowing the operator to position and move, on the image of the piece observed, a superimposed image of an area of effectiveness of the projectile or burst, when fired at a trigger point chosen in the piece of observation, the computer continuously determining the coordinates of the trigger point associated with the area of effectiveness and positioned within the piece when the operator activates the first and second control means to move the piece of observation and the area of effectiveness, validation means allowing the user to choose a particular location of the area of effectiveness, the computer thus providing the coordinates of the desired trigger point for the projectile or burst.

According to an embodiment, the receiver is a camera equipped with a shutter synchronized with the laser emission and opening the camera at the end of at least one delay determined with respect to the emission, the delay between the emission and the reception allowing to adjust the distance of the piece of observation with respect to the receiver.

According to an embodiment, the synchronized shutter also allows to adjust the width of the piece of observation.

The image of the area of effectiveness can advantageously be semi-transparent.

The image of the area of effectiveness can have a color different from the color of the rest of the image.

BRIEF DESCRIPTION OF THE DRAWINGS

The invention will be better understood upon reading the following description of a particular embodiment, the description being made in reference with the appended drawings in which.

DETAILED DESCRIPTION OF EMBODIMENTS

Figure 1:
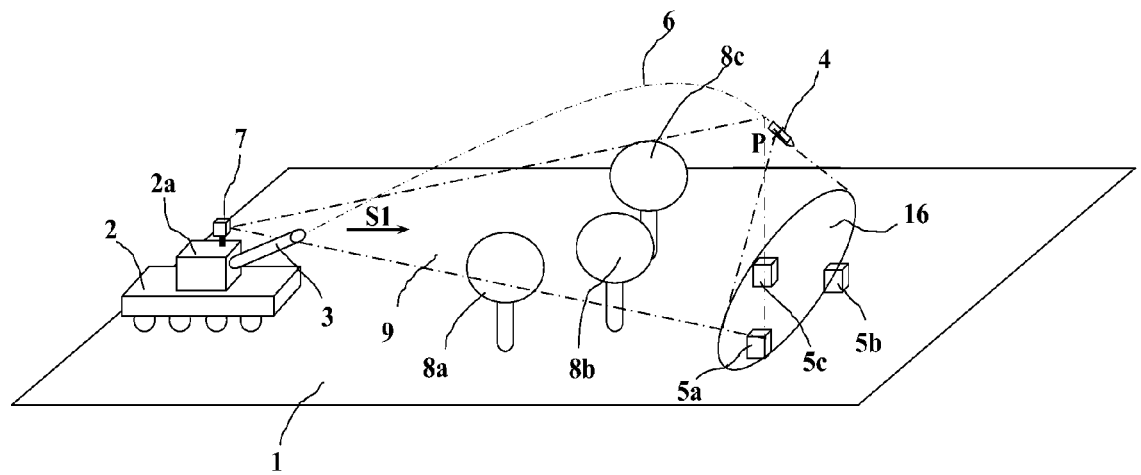
FIG. 1 shows a field part on which targets are located, and a vehicle equipped with a weaponry system and a fire-control system according to the invention.

When referring to FIG. 1, it is shown a field part 1 on which is located a vehicle 2 provided with a turret 2a carrying a gun barrel 3.

The gun barrel 3 is intended to fire explosive projectiles 4 towards targets 5a, 5b, 5c scattered on the field 1. Only one projectile 4 is shown here on its trajectory 6.

The gun barrel 3 can be oriented in elevation and in bearing with respect to the vehicle. Thus, the turret 2a can rotate about a vertical axis (bearing setting) and the barrel 3 can pivot with respect to the turret 2a along a substantially horizontal axis (elevation setting). Suitable motorizations are associated with these elevation and bearing adjustments of the gun barrel 3.

The turret 2a also carries observation means 7 constituted here by an active laser sensor 7, associating a laser emitter with a receiver and allowing to synchronously visualize the reflection of the laser pulses under the form of a piece of observation of the field.

These active-imagery sensors implement the technology known as "Sliding Range Gating".

Figure 2A:
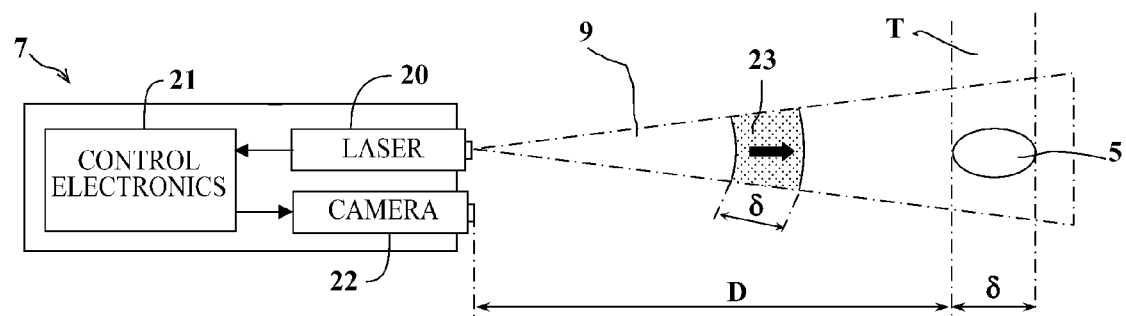
FIGS. 2a and 2b depict the operation of an observation means used by the invention.
Figure 2B:
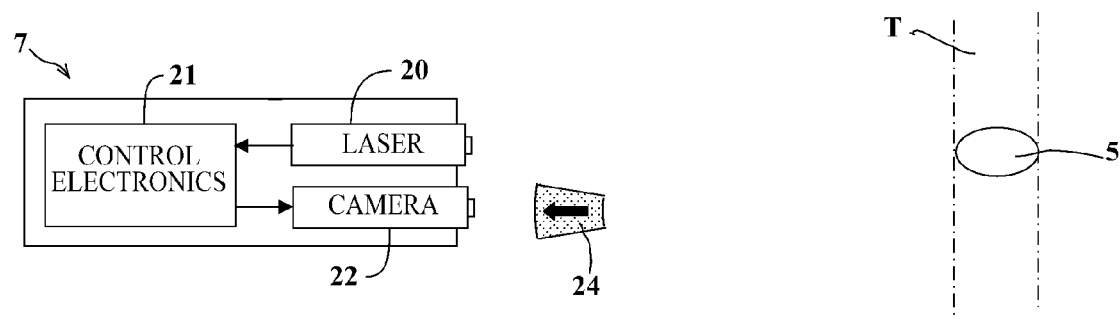

FIGS. 2a and 2b schematically show the structure of such a sensor 7 and the operation thereof.

The sensor or observation means 7 comprises a laser 20 (emitter) operating in the range of wavelengths from 1.06 micrometers to 1.54 micrometers. This laser 20 emits pulses towards a target 5 and is controlled by control electronics 21. The control electronics 21 allows to pilot the duration of the pulses 23 which are emitted. The duration of the pulse allows to define the width δ of a piece of analysis T of the field.

The sensor or observation means 7 also comprises a camera 22 (or receiver) driven by the control electronics 21. The camera comprises a shutter (not shown) synchronized with the laser emission and which opens the camera at the end of at least one delay R determined with respect to the emission of the pulse 23. The shutter is driven by the control electronics 21.

This delay R corresponds to the duration necessary for the light to travel twice the distance D separating the sensor 7 from the target 5, the delay between the emission and the reception allowing to adjust the distance between the piece of observation T and the receiver 22, thus between the piece T and the sensor 7.

Thus, the camera 22 is closed to all lights backscattered by the field and by the pulse 23, and is opened only to receive a part 24 of the pulse 23 reflected by the target 5.

With this technique, it is thus possible to acquire, by the observation means 7, images from a piece T of field with a width δ and located at a distance D from the sensor 7. The distance D and the width δ can be modified by the operator.

According to another embodiment, it is possible to implement a laser 20 emitting pulses, the duration of which allows to define a width greater than the width δ desired for the piece of analysis T of field. In this case, this radar will be associated with a camera or receiver 22 equipped with a shutter, synchronized with the laser emission but having an opening duration allowing to keep only the signals relating to a piece of field with a width δ. In this case, the shutter allows to define both the width δ (by its opening duration) and the distance D (by the delay R between its opening and the laser emission).

The observation means 7 is coupled to a fire-control system (not shown in FIG. 1) which is within the turret 2a and allows to control the motorizations ensuring the laying of the turret 2a and of the barrel 3 of the weapon towards the targets 5a, 5b, 5c.

The fire-control system will also ensure the programming of projectiles fired by the barrel. This programming comprises the configuration, by a (conventional and not shown) programming interface, in a memory of the projectile fuze, of a projectile triggering time at the end of the firing time.

The targets 5a, 5b, 5c have small sizes, for example lightweight vehicles or groups of combat soldiers.

The targets are further partially hidden with respect to the vehicle 2 by landscape elements, such as trees 8a, 8b, 8c, the foliage of which is not entirely opaque to the light.

The observation section of the observation means 7 is shown in FIG. 1 by a dotted-line cone. Thus, the observation means 7 faces the field along a direction S1 which corresponds to the axis of the cone 9.

Figure 3:
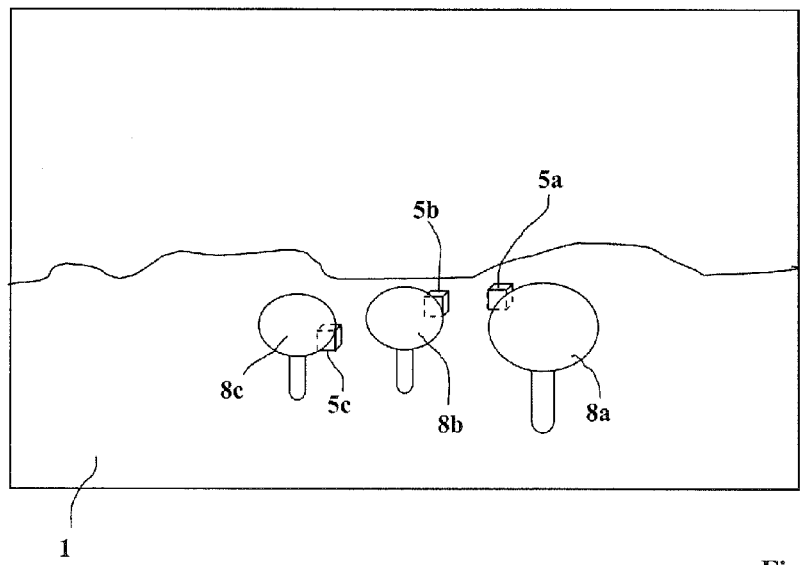
FIG. 3 shows an image of the field such as viewed by the gunner from a conventional camera without implementing the invention.

FIG. 3 shows the image of the field 1 as it is directly displayed on a screen of the fire-control system from a conventional camera which does not implement the invention.

It can be noted that the targets 5a, 5b and 5c are partially hidden by the trees 8a, 8b and 8c. A range finding of the targets from the fire-control system is thus difficult or even impossible.

The trees 8a, 8b, 8c intercept the signals of laser range finding, resulting in a bad programming of the triggering time of the projectile 4 on its trajectory.

A programming error results in a significant reduction of the hit probability. For firing a burst of ten projectiles at a distance of 1,200 meters, it was shown that a programming error of 10 meters results in a reduction up to 50% of the hit probability.

In addition, if the foliage is not entirely opaque, the targets 5a, 5b and 5c are viewed with a maximum signal/noise ratio because the light backscattered by the foliage is not detected by the camera 22, the shutter inhibiting the reception of the backscattered light.

Figure 4:
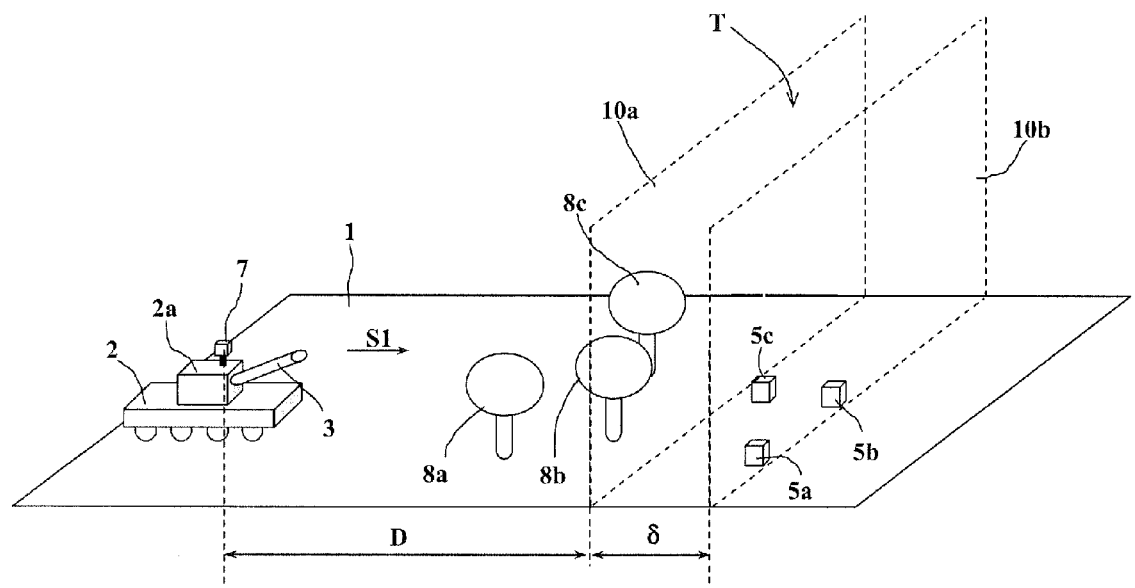
FIG. 4 depicts the tomographic acquisition of image planes of the field.

FIG. 4 shows the operational implementation of the method according to the invention.

With this method, the observation means 7 described above will be used to observe only the radiations reflected by the objects located in a piece T of field with a width δ which is located at a distance D from the observation means 7. This piece T is materialized in FIG. 4 by two planes 10a and 10b. Thus, the vision of the target 5a, 5b, 5c is less hidden by the obstacles located between the vehicle and the target, such as the trees 8a, 8b, 8c.

Figure 5:
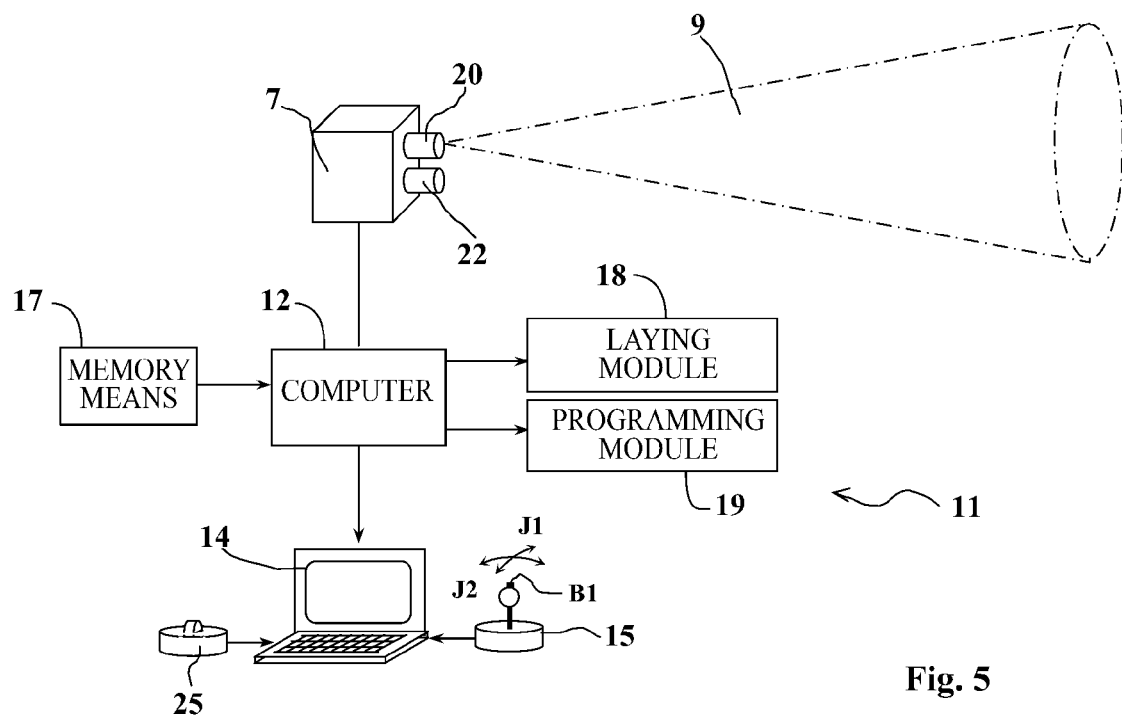
FIG. 5 is a diagram showing the architecture of the fire-control system according to the invention.

FIG. 5 shows a fire-control system 11 according to the invention.

This fire-control system 11 is intended to provide the coordinates of the trigger point P for the projectile 4 on its trajectory.

The fire-control system comprises the laser observation means 7 which allows to observe pieces T of the field 1 observed, and the thickness 5 and the distance D of the pieces can be adjusted by the operator. The value of the width δ of the piece T is adjusted by modifying the duration of each emitted (or received) pulse.

The distance D is adjusted by the operator by modifying the delay between the emission and reception of the laser pulse, thus the delay after an emission of pulse 23 and at the end of which the optics of the camera 22 is opened to receive the reflected pulses 24.

As mentioned above, it is also possible to adjust the width δ by the opening duration of the synchronized shutter of the camera 22.

Advantageously, for the piece T, a fixed value of the width δ will be chosen, which corresponds to the depth of an area of effectiveness of the projectile 4. Such an arrangement allows the operator to determine more easily the optimum trigger point for the projectile by varying only the observation distance D.

The fire-control system also comprises a computer 12 which handles the functions of the control electronics 21 of the observation means 7.

The fire-control system 11 also comprises first control means 25 which are, for example, a rotating thumbwheel allowing to adjust the value of the delay R between the emission and the reception, and therefore to modify the distance D by moving the piece of observation T.

During this operation for modifying the distance D, the operator can observe, on means for visualization, such as a screen 14, the presence of potential targets.

Figure 6:
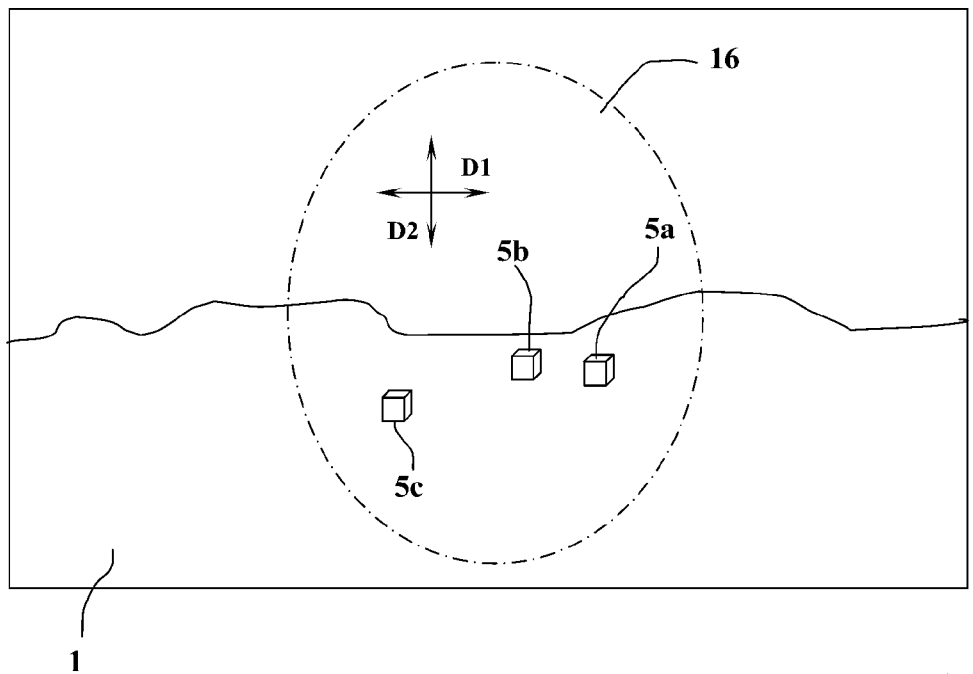
FIG. 6 shows an image of the field after implementation of the invention.

FIG. 6 shows what is seen by the operator on the screen 14 after implementing the synchronized-opening observation means 7. The targets 5a, 5b and 5c are not hidden anymore by the trees 8.

FIG. 6 shows a plane view projected on the plane of the figure. It is well understood that the screen 14 of the fire-control system allows to view an image of the piece of field in relief.

The fire-control system 11 also comprises second control means 15 implemented here as a lever (or joystick) which can be maneuvered along two orthogonal directions J1 and J2.

Once an acquisition piece T is chosen, the user uses the joystick 15 to position and move, on the image of the field 1, the image of an area of effectiveness 16 (FIGS. 1 and 5).

This area 16 is an image, built by the computer 12, of a geometrical volume or surface which allows to view the volume or surface area of effectiveness of the fragments generated by the projectile when fired at a trigger point P (FIG. 1).

This area of effectiveness is shown in the figures as a cone or as its elliptical sections to simplify the description. It is well understood that the volume, which will be superimposed on the image of the field, can have a different shape which will depend on the characteristics of the projectile 4 implemented. The geometrical characteristics of the area of effectiveness 16 associated with different trigger points P are incorporated in memory means 17 coupled to the computer 12.

It is common, during the definition of a projectile, to measure the distribution of fragments generated by the explosion of the projectile at different distances from the projectile.

Then, the area of effectiveness 16 of a projectile 4, initiated at a given point P, can be geometrically modeled and constitute a database allowing to associate different areas of effectiveness 16 with different initiation points P.

Thus, each movement of the area of effectiveness can be automatically associated, by the computer 12, with coordinates of an associated initiation point P.

For simplification purposes, the geometrical volume of the area 16 will be chosen such that it corresponds to a distribution of the fragments generated, allowing to ensure a given hit or neutralization probability. Such a probability corresponds, for example, to a minimum energy level for the fragments and/or to a minimum fragment density.

It is understood that the data are for a given type of projectile and do not depend on the characteristics of the field 1 and of the targets located therein.

A geometrical volume 16 can thus be systematically associated with any point in space, the geometrical volume 16 corresponding to the desired hit probability when the projectile 4 is initiated at this point.

According to the invention, this volume is moved by the user on the bi-dimensional or three-dimensional image of the field 1. This image of the area of effectiveness 16 is semi-transparent and does not hide the potential targets 5a, 5b and 5c. It also could have a color different from the color of the rest of the image so as to facilitate its visualization.

The width of the piece T being chosen equal to the depth of effectiveness of the projectile, it is just necessary to suggest to the operator a surface or volume 16 giving the shape of the area of effectiveness in the considered piece T.

Thus, the user can easily move, using the joystick 15, the area of effectiveness 16 along the directions D1 and D2 (FIG. 6). It allows the user to visually determine the position allowing to neutralize one or more targets 5a, 5b, 5c with the desired hit probability.

When moving the area 16 using the joystick 15, the computer 12 continuously determines the coordinates of the trigger point P corresponding to the position chosen for the area of effectiveness 16. Indeed, these coordinates are closely related to the geometry of the area 16 which is moved, and a movement of the area 16 corresponds in fact to a movement of the point P, the data being associated in the memory means 17.

The piece T having a width equal to the width of the area of effectiveness, the point P is located in a plane located in the middle of the piece, within equal distance from the planes 10a and 10b.

When the user has chosen a particular location for the area of effectiveness 16, he/she activates validation means (for example, a control switch B1 of the joystick 15).

The computer 12 thus provides to a laying module and a programming module 19 the coordinates of the desired trigger point P for the projectile, that was read in the memory means 17.

These coordinates are conventionally used by the laying module 18 to control the elevation and bearing layings of the gun barrel 3.

The coordinates are used by the programming module 19 to program the triggering time of the projectile 4 on the trajectory.

The invention was described for simplification purposes with respect to a use for controlling the firing of a single projectile.

The invention can be implemented in a similar way for controlling the firing of a burst of projectiles. A burst comprises a number of projectiles (4 to 10 for example) successively fired at the rate of fire of the weapon.

As it is possible by conception to define an area of effectiveness of a single projectile, it is also possible to geometrically define an area of effectiveness of a burst comprising a number of projectiles of a given type.

The means of the invention are implemented in the same way as described above.

However, what is visualized on the screen is not the area of effectiveness of a single projectile anymore, but the area of effectiveness of a burst. The trigger point P thus corresponds to a mean point, the barycenter of the trigger points of the different projectiles of the burst. Based on the selection of the area of effectiveness, a burst ensuring an initiation, with a statistical distribution of the initiation times of the projectiles of the burst in the considered piece, can also be defined in the fire-control system.

Once the area of effectiveness is positioned by the user, the computer 12 transmits as previously to the laying module 18 and the programming module 19 the different firing parameters (laying angles) and burst managing parameters (programming of the triggering time of each projectile).

The invention claimed is:

1. A method for acquiring the coordinates of a trigger point of a projectile or of a burst of projectiles on a trajectory and above a field part on which a target is located, wherein the method comprises the following steps:
    emitting from a laser source at least one laser pulse having a predetermined duration and directed towards the field part where the target is located,
    receiving the images reflected by the field part with a receiver equipped with means for the synchronous visualization of the reflection of the laser pulses under the form of a piece of observation of the field part, the width of the piece of observation being adjustable by selecting a duration for the laser emission or reception, and the distance of the piece of observation with respect to the receiver being adjustable by adjusting a delay between the emission and the reception of the laser pulse,
    recovering the coordinates of a trigger point when the operator has chosen a location after having moved the piece of observation with respect to the receiver and adjusted the width of the piece of observation, the trigger point being within the piece of observation.

2. The method according to claim 1, wherein the width of the piece of observation is chosen substantially equal to the depth of an area of effectiveness of the projectile or of the burst.

3. The method according to claim 1, wherein an image of the observed piece of observation is displayed on means for visualization intended for an operator, the image comprising a superimposed image of the area of effectiveness of the projectile or of the burst, when fired at a trigger point associated with the area of effectiveness and positioned in the piece of observation, the operator having the option to move the area of effectiveness with respect to the image of the piece of observation, the coordinates of the trigger point being determined after the area of effectiveness was moved.

4. A fire-control system which can be associated with a weapon firing projectiles or bursts of projectiles and allowing to provide the coordinates of a trigger point for a projectile or a burst fired by the weapon, the fire-control system implementing the method according to claim 1 and wherein the fire-control system comprises:
    at least one synchronized pulses laser observation means associating a laser source or emitter which can emit pulses having a determined duration with a receiver equipped with means for the synchronous visualization of the reflection of the laser pulses under the form of a piece of observation of the field part having a width adjustable by selecting a duration for the laser emission or reception, and the distance of the piece of observation with respect to the receiver is adjustable by adjusting a delay between the emission and the reception,
    a computer to rebuild, using an algorithm, an image of the piece of observation acquired by the observation means, the image being displayed on the means for visualization,
    first control means intended for a user and allowing to position and move the piece of observation at a greater or shorter distance from the observation means,
    second control means allowing the operator to position and move, on the image of the piece of observation observed, a superimposed image of an area of effectiveness of the projectile or burst, when fired at a trigger point chosen in the piece of observation,
    the computer continuously determining the coordinates of the trigger point associated with the area of effectiveness and positioned within the piece of observation when the operator activates the first and second control means to move the piece of observation and the area of effectiveness,
    validation means allowing the user to choose a particular location of the area of effectiveness, the computer thus providing the coordinates of the desired trigger point for the projectile or burst.

5. The fire-control system according to claim 4, wherein the receiver is a camera equipped with a shutter synchronized with the laser emission and opening the camera at the end of at least one delay determined with respect to the emission, the delay between the emission and the reception allowing to adjust the distance of the piece of observation with respect to the receiver.

6. The fire-control system according to claim 5, wherein the synchronized shutter also allows to adjust the width of the piece of observation.

7. The fire-control system according to claim 4, wherein the image of the area of effectiveness is semi-transparent.

8. The fire-control system according to claim 7, wherein the image of the area of effectiveness has a color different from the color of the rest of the image.

* * * * *